Figure 1:
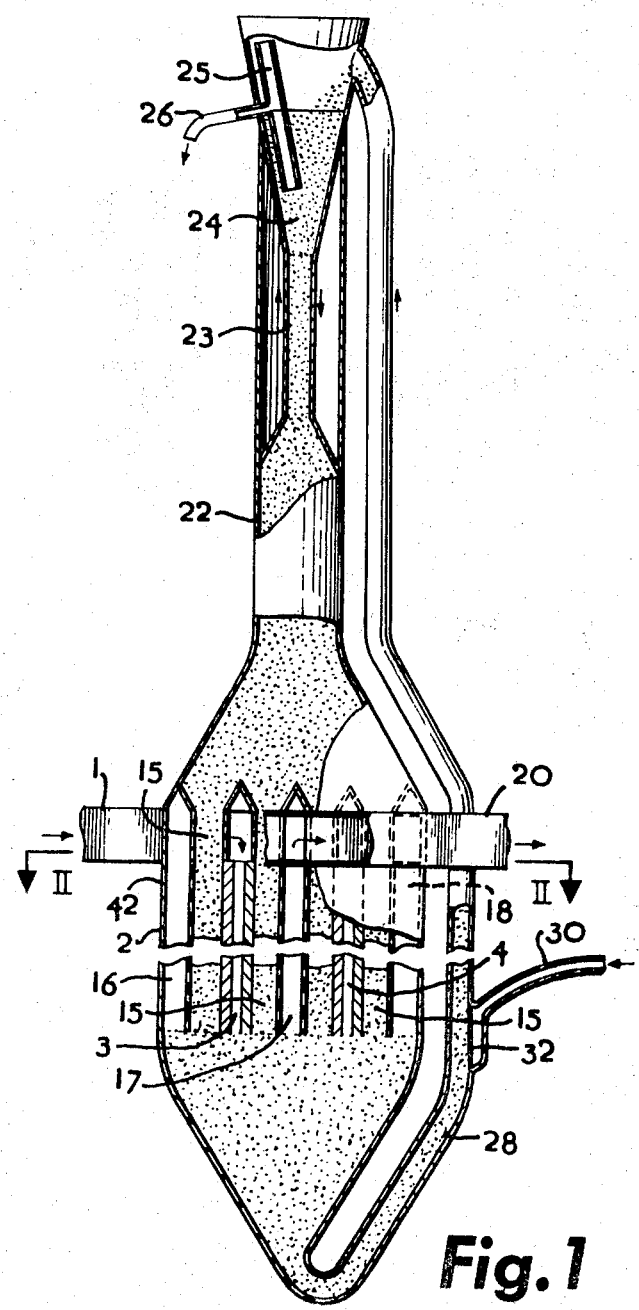

United States Patent

[11] 3,537,582

[72] Inventor Laszlo Demeter
 Budapest, Hungary
[21] Appl. No. 622,550
[22] Filed March 13, 1967
[45] Patented Nov. 3, 1970
[73] Assignee Simonacco Limited
 Cumberland, England
 a British Company
[32] Priority March 21, 1966
[33] Hungary
[31] No. DE-546

[54] FILTRATION
 6 Claims, 4 Drawing Figs.
[52] U.S. Cl. .................................................. 210/189,
 210/268
[51] Int. Cl. .................................................. B01d 33/30
[50] Field of Search .......................................... 210/33,
 189, 268

[56] References Cited
 UNITED STATES PATENTS
2,057,887  10/1936  Elliott et al. .................. 210/268X
2,170,180  8/1939   Youker ......................... 210/268X
2,863,829  12/1958  Henke et al. .................. 210/33X
3,238,125  3/1966   Mihara et al. ................. 210/268X
1,130,382  3/1915   Deacon et al. ................. 210/189
 FOREIGN PATENTS
474,615    12/1914  France ......................... 210/268
632,786    12/1961  Canada ......................... 210/268

Primary Examiner—Samih N. Zaharna
Attorney—Norris & Bateman

ABSTRACT: A liquid filter comprising a container, a liquid inlet leading into said container and a liquid outlet leading from said container, the arrangement being such that in the operation of the filter a substantially continuously moving body of discrete filter particles is provided through which liquid to be filtered passes, transversely of said body, in passing from the inlet to the outlet, filter particles through which liquid has been passed are conveyed to a locality where they are cleaned by contacting with liquid which has been filtered by the body of filter particles, and the cleaned filter particles are recycled for further filtration of liquid.

FILTRATION

BACKGROUND AND SUMMARY OF INVENTION

This invention relates to apparatus and a process for the filtration of a liquid.

Contaminations suspended in surface water and particularly in river water has been removed according to previously proposed arrangements, by sedimentation followed by purification. In such arrangements filtration is effected through horizontally arranged filter layers having a thickness of 1 to 2 metres, the filter layers consisting of particles with close size limits. The crude water to be filtered is allowed to pass through each filter layer in a vertical direction, generally downwardly but sometimes upwardly. The contaminations suspended in the crude water are retained in the interstices between the particles as they pass through the filter layer.

A common disadvantage of such previously proposed filtration equipment is that the interstitial spaces between the particles become saturated with suspended contaminations within a short period of time and the filter layers lose their filtering power. In order to regenerate each filter layer it must be washed with a mixture of water and air blown in at the bottom. For this operation it is necessary to interrupt filtration and thus considerably reduces the output of the aforesaid filtration arrangements. A relatively great amount of pure water is needed for washing the filter particles. This is an appreciable loss since one of the main objects of the arrangement is the production of pure water. Furthermore during the washing operation large masses of filter particles must be moved and this requires equipment of appreciable costs of investment and operation. Such equipment takes up a considerable amount of space necessitating large buildings and expensive machinery for operation.

Filtration equipment has also been proposed where, in order to ensure continuous operation of the filtration process, the contaminated particles are sucked off by an injector from the bottom of a tank containing a filter layer. These particles are then transferred into a tank filled with liquid where the contaminations adhering to the filter particles are removed by sedimentation, and the purified or decontaminated particles are recycled into the filtration tank by a second injector. In this type of equipment also, however, the crude water to be filtered is passed through a horizontally arranged layer of sand or other granular substance in a vertical direction. Such equipment again has the disadvantage that a considerable amount of space is required and is expensive to operate due to the use of the two pumps. It is generally known that injectors operate at a very low output. On taking into account the fact that great amounts of substances are required to be moved by the injectors at relatively high rates, it will be apparent that water filtration of this type is an expensive operation. In addition, the contaminations are not completely removed from the filter material because the filter particles are transferred into the filtration tank with the aid of unfiltered crude water, and this method is therefore unsuitable for yielding completely purified or decontaminated particles and subsequent filter layer.

An object of the present invention is to provide a process and apparatus for the removal of contaminations suspended in for example surface waters and particularly river waters, whereby the filtration of crude water can be continuously and successfully carried out safely without interruption over a considerable period of time e.g., months.

A further object of the invention is to provide an arrangement wherein the contamination removed from the crude water by filtration can be continuously removed from the contaminated filter particles simultaneously with the filtration process.

According to the present invention there is provided apparatus for continuously filtering a liquid comprising a container, filter means within said container for permitting substantially continuous movement of one or more columns of filter particles in a downward direction and effecting passage of the liquid to be filtered through said column or columns in a direction substantially transverse to the direction of movement of said column or columns, and means for collecting the filtered liquid after having passed through the column or columns.

Preferably the container has an upper part and a lower part of greater cross section than the upper part and in which lower part the column or columns of filter particles are adapted to be located, means for recycling contaminated particles to the upper part of the container, means for effecting passage of a portion of the liquid fed to the container against the downward flow of recycled contaminated particles to decontaminate them prior to the decontaminated filter particles passing downwards to the filter means, and means for affecting discharge from the container of said liquid portion contaminated thereby.

According to a further aspect of the invention there is provided a process of continuously filtering a liquid comprising effecting substantially continuous movement of one or more columns of filter particles in a downward direction, passing the liquid to be filtered through each column in a direction substantially transverse to the direction of movement of the column and collecting the liquid filtered thereby.

The term "substantially continuous" as used herein and in the claims in relation to the downward movement of the filter particles is intended to include, as well as completely continuous movement, intermittent movement at intervals sufficiently frequent to achieve the desired rate of substitution of contaminated filter particles by clean filter particles for the filtering operation.

The process and apparatus in accordance with the present invention have the following advantages:

The liquid to be purified must pass, instead of through a filter layer of a thickness of a few metres as in conventional filtration equipment, only through a filter column of a thickness of some decimetres. Thus, the filtration rate, and the filtration output of the equipment of the invention, considerably exceeds that of the conventional filtration equipment. This becomes possible by applying, instead of the conventional vertical streaming, an almost horizontal or transverse direction of flow of the liquid to be filtered through the filter column or columns. This can be used in the equipment according to the invention because the filter particles in each filter column are substantially continuously replaced, and thus, the liquid to be filtered always passes through pratically pure particles in the filter column which serves to maintain an efficient filtration process. Owing to the high purifying efficiency of the equipment, the equipment according to the invention can be constructed in a considerably smaller size than conventional water purifying equipment. Consequently, the production costs are lower, the space requirements are similarly lower, and significantly smaller and cheaper buildings are required to house the equipment. The decrease in space requirement is mainly due to the fact that the filter layer is arranged in a vertical direction in the form of a column or columns instead of the conventional horizontal arrangement.

The cycling rate of the filter particles can be varied, quite independently of the actual filtration process, simply by controlling the means e.g., pneumatic, for recycling the contaminated particles to the upper part of the container. Thus, the equipment needs notably smaller quantities of filter particles than conventional filtration equipment of the same output and the quality of filter particles does not require to be renewed. This smaller quantity of filter particles only requires for its movement and recycling by pneumatic means an air compressor of small output and low pressure. Consequently, the costs of operation of the equipment according to the invention are low, and the costs of capital investment amount only to a fraction of those of the conventional equipment.

The operation of the equipment is safe because there are no moving parts, and thus failures are obviated or mitigated.

DRAWINGS

There now follows a description to be read with reference to the accompanying drawings, of a liquid filter embodying the invention. This description is given by way of example of the invention only and not by way of limitation thereof.

Figure 2:
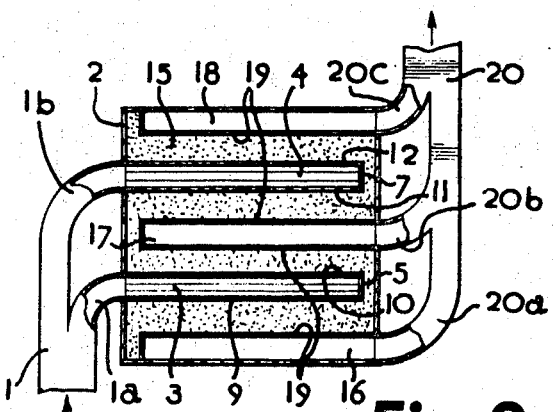
Figure 3:
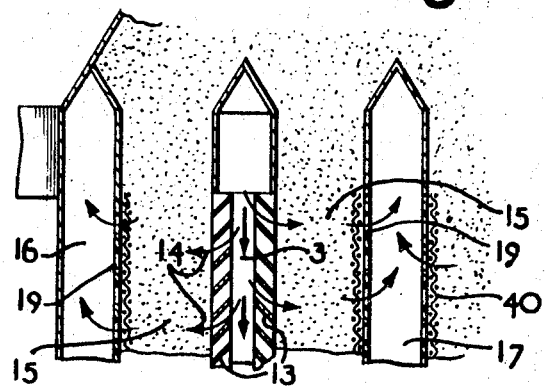
Figure 4:
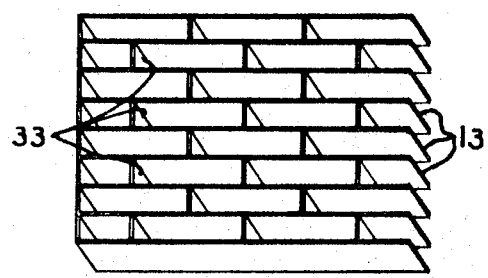

In the accompanying drawings:

FIG. 1 shows a side elevation of the filter;
FIG. 2 shows a section on the line II–II of FIG. 1;
FIG. 3 shows an enlarged view of parts shown in FIG. 1; and
FIG. 4 shows a perspective view of parts shown in FIG. 3.

DESCRIPTION

The filter comprises a vertically elongated container 2, a liquid inlet 1 leading into the container 2, and a liquid outlet 20 leading from the container 2. In the operation of the filter a continuously vertically downwardly moving body of discrete sand particles, comprising four separate continuously moving filter curtains 15, is provided through which liquid to be filtered passes generally horizontally in passing from the inlet 1 to the outlet 20.

The inlet 1 comprises two branches 1a, 1b (FIG. 2) which lead into spaced chambers 3, 4, respectively. The chamber 3 comprises opposed vertical walls 9, 10 which are perforated for the passage therethrough of water to be filtered; and the chamber 4 comprises opposed vertical walls 11, 12 which are also perforated for the passage therethrough of water to be filtered. The outlet 20 comprises three branches 20a 20b, 20c which lead from spaced chambers 16, 17, 18 respectively. The chambers 16, 17, 18 comprise vertical walls 19 facing the walls 9, 10, 11, 12 of the chambers 3, 4; each wall 19 is perforated for the passage therethrough of filtered water; the walls 9, 10, 11, 12, 19 all extend vertically and horizontally along the body of filter particles adjacent thereto. The sand curtains 15 are provided between the adjacent pairs of chambers 3, 16; 3, 17; 4, 17; and 4, 18. The perforations in each wall 9, 10, 11, 12 are inclined downwardly and are provided by inclined plates 13 (FIGS. 3 and 4) which are spaced by vertical support members 33. Each perforated wall 19 is covered by a sieve cloth 40 which prevents sand particles passing through the wall 19. In a modification the sieve cloth 40 is omitted and the perforations in the wall 19 are themselves small enough to prevent passage of sand particles therethrough. The chambers 3, 4, 16, 17, 18 are located in a lower bulbous portion 42 (FIG. 1) of the container 2.

The container 2 comprises a vertical stem 22 which leads from the bulbous portion 42 via a constriction 23 to an upper, funnel, portion 24 which is open at the top. A downwardly extending stub pipe 25 open at its upper and lower ends is provided in the funnel portion 24 and an outlet 26 leads from the pipe 25 out of the container 2. A pipe 28 leads from the lower end of the container 2 to the funnel portion 24 and enters the funnel portion 24 at a level below the upper end of the pipe 25 and above the outlet 26; a pipe 30 leads from a supply of compressed air (not shown) via a flap valve or screen 32 into the pipe 28. In a modification a plurality of pipes, corresponding to the pipe 28, lead from the lower end of the container 2 to the funnel portion 24.

In the operation of the filter, water to be filtered enters the inlet 1 from a header tank (not shown) above the level of the outlet 26, passes to the chambers 3, 4, passes through the perforated walls 9, 10, 11, 12, through the sand curtains 15, which are moving downwardly by gravity, through the perforated walls 19 and into the outlet 20. Some water rises along the stem 22 and, in the constriction 23 and the funnel portion 24, contacts used sand particles to clean them; water has been filtered through these sand particles in the bulbous portion 42 and they have been conveyed from the bulbous portion 42 along the pipe 28 to the funnel portion 24; the water which has cleaned the sand particles passes to waste via the stub pipe 25 and the outlet 26; it will be realized that the liquid level in the funnel portion 24 is controlled by the outlet 26. An aqueous slurry of sand particles to be cleaned is conveyed upwardly to the funnel portion 24 along the pipe 28 by compressed air from the pipe 30; passage of sand into the pipe 30 is prevented by the flap valve or screen 32. Cleaned sand particles are recycled by gravity down the stem 22 and back to the bulbous portion 42 for further filtration of water. It will be realized that by varying supply of air along the pipe 30 the rate of recycle of sand can be varied independently of the flow rate of liquid through the filter.

I claim:

1. Apparatus for continuously filtering a liquid comprising a container, filter means within said container for permitting substantially continuous movement of a plurality of relatively narrow columns of filter particles in a downward substantially vertical direction and effecting passage of the liquid to be filtered through each column in a substantially horizontal direction, said filter means comprising a plurality of units each of which includes an inlet chamber and an outlet chamber having coextensive portions extending longitudinally a substantial distance along one of said columns and defining a passage for one of said columns of filter particles, each said inlet chamber having a side wall defining one side of said passage, each said side wall comprising a series of overlapping plates inclined downwardly and towards said passage, each said outlet chamber having a perforated side wall defining the other side of said passage, means for supplying liquid to be filtered to each said inlet chamber for passage outwardly between said overlapping plates substantially horizontally across said column and through said perforated side wall into an outlet chamber, the inlet and outlet chambers of said units being disposed alternately across the container so that each inlet chamber can cooperate with a filter column on each side of said inlet chamber, and means for collection the filtered liquid from said outlet chambers.

2. Apparatus as claimed in claim 1, in which the container has an upper part and a lower part of greater cross section than the upper part and in which lower part said units are located, means for recycling contaminated particles to the upper part of the container, means for effecting passage of a portion of the liquid fed to the container against the downward flow of recycled contaminated particles to decontaminate them prior to the decontaminated filter particles passing downwards to the filter means, and means for effecting discharge from the container of said liquid portion contaminated thereby.

3. Apparatus as claimed in claim 1, comprising pneumatically operated means for recycling the contaminated particles to the upper part of the container and thereby effecting the substantially continuous downward movement of said column.

4. Apparatus as claimed in claim 3, in which the pneumatically operated means comprises a pipe interconnecting the lower part of the container and the upper part of the container, and a source of pneumatic pressure connected to said pipe for effecting movement of contaminated filter particles up the pipe to the upper part of the container.

5. Apparatus as claimed in claim 1, in which means is provided for recycling contaminated filter particles which flow downwardly in said column, and means is provided for effecting passage of a portion of the liquid against the downward flow of contaminated filter particles and such latter means comprises a source of liquid to be filtered located at a level above the discharge of filtered liquid from the container whereby a sufficient head of pressure is created to effect said passage of liquid upwardly from the filter means.

6. Apparatus as claimed in claim 5, comprising a restriction through which said portion of liquid can pass, said restriction acting to increase the velocity of the liquid flowing against the contaminated particles.